United States Patent

Chow et al.

(10) Patent No.: US 11,218,596 B1
(45) Date of Patent: Jan. 4, 2022

(54) CONTACT CALLBACK SYSTEM

(71) Applicant: Capital One Services, LLC, McLean, VA (US)

(72) Inventors: Chih-Hsiang Chow, Plano, TX (US); Steven Dang, Plano, TX (US); Elizabeth Furlan, Plano, TX (US)

(73) Assignee: CAPITAL ONE SERVICES, LLC, McLean, VA (US)

(*) Notice: Subject to any disclaimer, the term of this patent is extended or adjusted under 35 U.S.C. 154(b) by 0 days.

(21) Appl. No.: 17/197,695

(22) Filed: Mar. 10, 2021

(51) Int. Cl.
H04M 3/523 (2006.01)
H04M 3/42 (2006.01)
G06Q 30/02 (2012.01)

(52) U.S. Cl.
CPC ...... H04M 3/5231 (2013.01); G06Q 30/0255 (2013.01); H04M 3/42068 (2013.01); H04M 3/42195 (2013.01); H04M 2203/555 (2013.01)

(58) Field of Classification Search
CPC ........... H04M 3/5231; H04M 3/42195; H04M 3/42068; H04M 2203/555; G06Q 30/0255
USPC ........... 379/210.01, 207.15, 207.13, 265.11, 379/265.05, 265.14, 266.03, 266.06, 379/266.01
See application file for complete search history.

(56) References Cited

U.S. PATENT DOCUMENTS

| 6,731,609 | B1* | 5/2004 | Himi ................. H04L 12/1813 370/260 |
| 10,089,642 | B2 | 10/2018 | Waller et al. |
| 10,490,191 | B1* | 11/2019 | Benkreira ................ G10L 15/22 |
| 10,750,017 | B2 | 8/2020 | St-Cyr et al. |
| 2006/0155665 | A1* | 7/2006 | Sekiyama ............ G05D 1/0088 706/59 |
| 2013/0282430 | A1 | 10/2013 | Kannan et al. |
| 2017/0262885 | A1 | 9/2017 | Fuentes et al. |
| 2018/0018706 | A1 | 1/2018 | Tognetti |
| 2019/0340653 | A1 | 11/2019 | Kumar et al. |

* cited by examiner

Primary Examiner — Thjuan K Addy
(74) Attorney, Agent, or Firm — Sterne, Kessler, Goldstein & Fox P.L.L.C.

(57) ABSTRACT

Disclosed herein are various embodiments for a customer callback system. An embodiment operates by determining a call action indicating a customer to whom a representative is to speak. Data corresponding to an identifier associated with a computing device of the customer and an ad history indicating when a plurality of ads were presented to an application on the computing device of the customer over a defined period of time are retrieved. Based on the data, a pattern associated with when the customer is using the computing device is generated. The pattern is based on a comparison of a first period of time a second period of time during when ads were presented to the computing device. Based on the pattern, a target time indicating when to perform the call action is produced.

20 Claims, 4 Drawing Sheets

CONTACT CALLBACK SYSTEM

TECHNICAL FIELD

This application is generally directed to digital data processing systems and more specifically to calculating resource availability

BACKGROUND

Customer and client relationships are often the lifeblood of many businesses and other organizations. When customers can call in and speak to representatives directly, many of the customer's issues can be resolved, thus improving the relationship. However, there are times when customers cannot immediately reach a representative by phone and may request a call from a representative of an organization to address a particular issue. Responding to the customer request and trying to call the customer back at a time that is going to be convenient for the customer, when the customer is free to speak, is often just a guessing game by the representative. And each time the representative calls and the customer does not answer or does not have time to speak, company resources are wasted and the customer experience or relationship with the organization is potentially degraded.

SUMMARY

Provided herein are system, apparatus, article of manufacture, method, computer-readable medium, and/or computer program product embodiments, and/or combinations and sub-combinations thereof, for a contact callback system.

Many embodiments include a computer implemented method for the contact callback system. The method may operate by determining a call action indicating a customer to whom a representative is to speak. An identifier associated with the customer and corresponding to a computing device is determined. An ad history indicating when a plurality of ads were presented to the computing device over a defined period of time is retrieved. A pattern, indicating an overlapping time of day on at least two separate days when a subset of the plurality of ads were presented to the computing device, is identified. The overlapping time of day is provided to the representative during which to perform the call action.

Many embodiments include a system for the contact callback system. The system may include at least one processor and a memory coupled to the at least one processor and configured to determine a call action indicating a customer to whom a representative is to speak. An identifier associated with the customer and corresponding to a computing device is determined. An ad history indicating when a plurality of ads were presented to the computing device over a defined period of time is retrieved. A pattern, indicating an overlapping time of day on at least two separate days when a subset of the plurality of ads were presented to the computing device, is identified. The overlapping time of day is provided to the representative during which to perform the call action.

Many embodiments include a non-transitory computer-readable medium having instructions stored thereon that, when executed by at least one computing device, causes the at least one computing device to perform operations. The operations may include determining a call action indicating a customer to whom a representative is to speak. An identifier associated with the customer and corresponding to a computing device is determined. An ad history indicating when a plurality of ads were presented to the computing device over a defined period of time is retrieved. A pattern, indicating an overlapping time of day on at least two separate days when a subset of the plurality of ads were presented to the computing device, is identified. The overlapping time of day is provided to the representative during which to perform the call action.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing a contact callback system (CCS).

In some embodiments, the CCS can improve user-representative relationships by determining a most likely window in which a representative can contact a user to complete a user inquiry operation. In some embodiments, a system for efficient utilization of cloud computing services comprises a memory and at least one processor coupled to the memory. In some embodiments, the system is configured to perform operations. In some embodiments, a computer-implemented method performs the operations. The operations can include one or more of the following: determining a call action indicating a customer to whom a representative is to speak, determining an identifier associated with the customer, retrieving an ad history indicating when a plurality of ads were presented to the computing device over a defined period of time, identifying a pattern associated with when a subset of the plurality of ads were presented to the computing device, wherein the pattern indicates an overlapping time of day on at least two separate days when one or more of the subset of ads were presented to the computing device, and/or providing the overlapping time of day to the representative during which to perform the call action. The identifier may correspond to a computing device.

Figure 1:
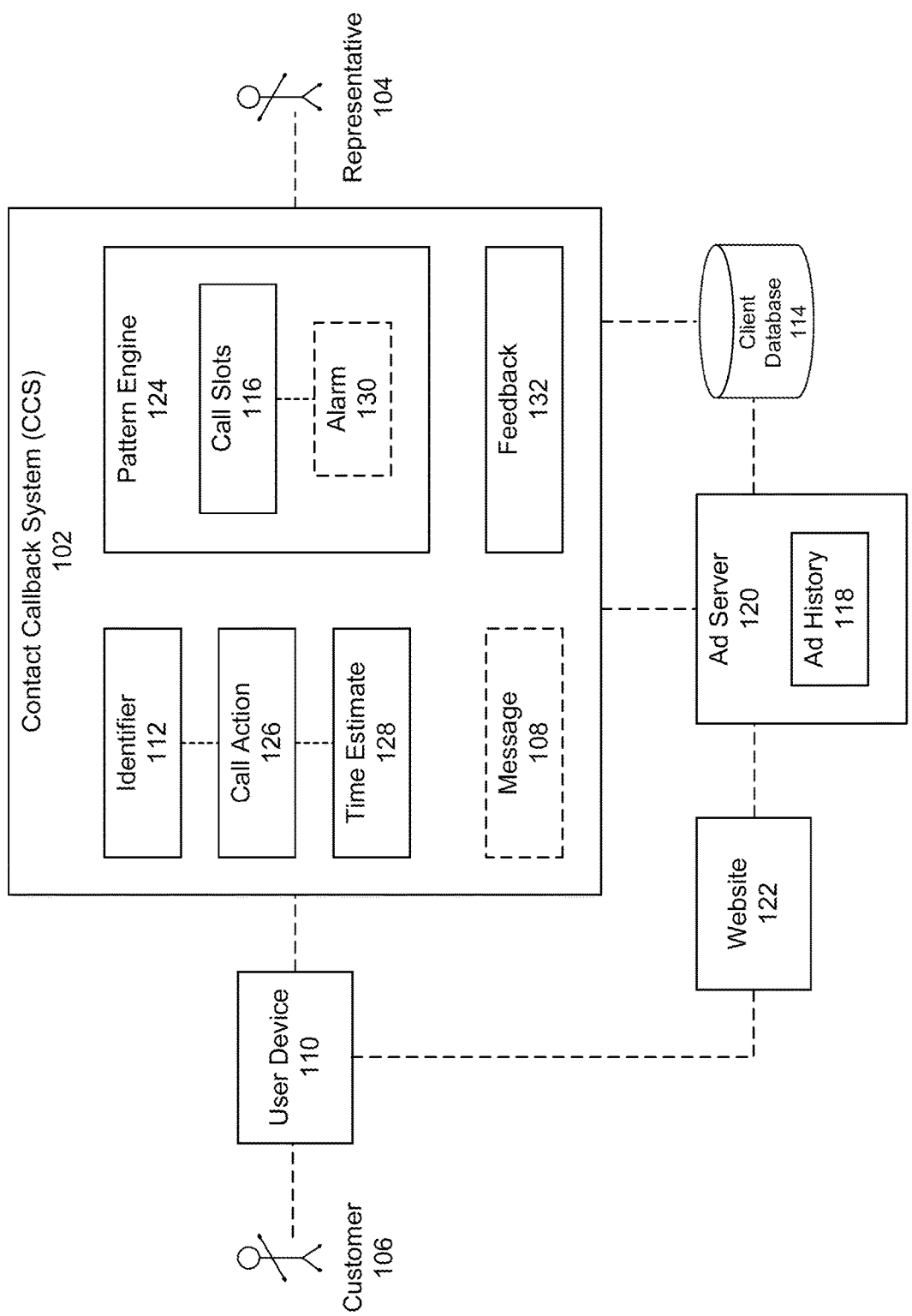
FIG. 1 is a block diagram illustrating example functionality for providing a contact callback system (CCS), according to some embodiments.

FIG. 1 is a block diagram 100 illustrating example functionality for providing a contact callback system (CCS) 102, according to some embodiments. CCS 102 may determine or predict times when a representative 104 of an organization should call or otherwise contact a user 106, e.g., a customer 106, based on which advertisements ("ads") were provided to a user device 110 of customer 106, and how customer 106 may have interacted with those ads, during one or more periods of time.

In many embodiments, representative 104 may represent any organization, such as a business, social, religious, or other group, club, or causes. In some embodiments, representative 104 may be a sales associate, customer service employee, human resources personnel, billing assistant, or other person associated with the organization. Customer 106 may be a current, former, or prospective customer, client, or member of the organization.

Message 108 may be any customer interaction or contact with any system or representative 104 of an organization requesting a contact from a member of the organization. Example messages 108 may include submitting a form on a website requesting more information or applying for a product/service/program, voicemail, email, other electronic messages, other messages, etc. Message 108 may indicate the subject matter or issue of interest for customer 106 and may include contact information such as a name, callback telephone number, account number, user ID, or email address. In many embodiments, customer 106 may leave a voice message 108 requesting that an associate or representative 104 call the customer 106 back regarding a particular issue.

In many embodiments, customer 106 may use a user device 110 to submit the message 108 received by CCS 102 requesting contact from a representative 104. User device 110 may be a laptop, desktop computer, mobile phone, tablet, other internet connected computing device, etc. For example, message 108 may be received from customer 106 as an electronic communication, such as emails, text messages, and/or website forms. In many embodiments, CCS 102 may retrieve or generate an identifier 112 (e.g., user ID, IP address, or the like) that is associated with message 108.

Identifier 112 may be a code or alphanumeric sequence that is assigned to message 108 and used to identify customer 106 and/or user device 110. Example identifiers 112 include an internet protocol (IP) address, media access control (MAC) address, email address, phone number, username, user ID, or the like. For example, CCS 102 may identify an IP address associated with user device 110 used to send or submit message 108 or visit a website 122. Or for example, message 108 may include other identifying information regarding customer 106, such as name, email, account number, order number, inquiry number, etc.

In many embodiments, CCS 102 may maintain a client database (DB) 114. Client DB 114 may include account and/or identifier information about customers 106 and/or user devices 110. In many embodiments, client DB 114 may include identifying information, such as name, email address, account information, IP address(es), MACD address(es), cookie identifiers, phone number, etc. for or associated with a particular customer 106.

For example, user device 110 may be used to visit website 122, which may record a particular IP address of user device 122. The customer 106 may submit a help request message 108 with identifying information such as an account number. Client DB 114 may track and link IP address of the user device 110 with the account number of the customer 106.

Client DB 114 may include information that was gathered over time and over various interactions between customer 106 using one or more user devices 110 to interact with various websites or other electronic systems and/or representatives 104 of an organization or conglomerate.

Using client DB 114 and/or the metadata or contents of message 108, CCS 102 may identify that a particular IP address associated with message 108 corresponds to a particular customer 106. Or, for example, CCS 102 may determine that a phone number retrieved from message 108 (such as a voicemail) corresponds to a particular customer 106. And client DB 114 may include an IP address that is associated with a user device 110 previously used by customer 106. Client DB 114 may include information that enables CCS 102 to link the information retrieved from message 108 to a user device 110, both of which correspond to or are identified with the same customer 106.

In other embodiments, identifier 112 may be identifying information other than IP address. For the sake of simplicity, as referred to in many of the embodiments described herein, identifier 112 may be an IP address, and those terms identifier and IP address may be used interchangeably merely for convenience of description.

From message 108, CCS 102 may determine, receive, or generate a call action 126 that is to be performed by representative 104 in reaching back out to or calling customer 106. Call action 126 may be a voice call, video call, online chat, other real-time communication, or the like. For example, if customer 106 requests more information about Product X from a website 122, CCS 102 may automatically generate a call action 126 that is assigned to representative 104. Or, for example, if message 108 is a voicemail, representative 104 may input or provide the information necessary for CCS 102 to generate a call action 126 (e.g., indicating the customer 106 is interested in more information about Product X).

In some embodiments, representative 104 calls customer 106 at a random time, but it is likely that the customer 106 may be busy or unavailable to connect or speak with representative 104. In some aspects, each call to customer 106 costs an organization time, money, and resources. In some aspects, it is inefficient for a representative 104 to randomly try calling a customer 106 at various times. Further, in some aspects each missed call or communication from representative 104 to customer 106 may also degrade the customer's experience with the organization or representative 104. In some embodiments, CCS 102 can address these and other issues by identifying target times or call slots 116 when the representative 104 may call the customer 106.

Each call slot 116 may be a target or predicted period of time when customer 106 is likely to be available to answer a phone call or talk about message 108 as determined by CCS 102. In some embodiments, call slots 116 may be identified or generated based on prior computing activity by customer 106, particular with regard to interactions with electronic advertisements.

In many embodiments, advertisements may be provided to user device 110 while it is visiting website 122, using an app, or the like. An app may include any program or application that is operating on or accessible through the Internet from user device 110. The app may include online and/or offline functionality. An ad server 120 may record the IP address of user device 110 receiving, displaying, and/or from which interactions with the ads are received. This information may be stored as ad history 118. In many embodiments, when a particular user ID or IP address is identified as being associated with message 108, CCS 102 may retrieve or request an ad history 118 corresponding to the identifier 112.

In many embodiments, CCS 102 may request from or maintain on ad server 120 an ad history 118 about customer 106. Ad server 120 may be any computing device(s) that are used to monitor or track electronic communications or interactions from one or more user devices 110. In many embodiments, ad server 120 may identify which advertisements were provided to which user devices 110 and/or user accounts over one or more apps, web applications, websites 122, or the like. In many embodiments, ad server 120 may group interactions based on an overlap of IP addresses, such that each IP address may have its own ad history 118.

Ad history 118 may be a tracking, list, history, or the like of different ads that were presented to a particular identifier 112 over various periods of time. Ad history 118 may also include a tracking of any interactions between user device 100 and the ad, e.g., a duration for which an ad was displayed. For example, when a customer 106 operates user device 110 to visit or load a website 122, website 122 may present ads to user device 110. The ads may include banner ads, click through ads, initial ads, or the like that may be closed by the user, etc. The ads may include any multimedia data, including video, audio, images, and text.

In some embodiments, ad history 118 for each user device 110 may include a tracking or recording, for a particular IP address, of when particular ads were presented or displayed for an IP address, on which website(s) 122 those ads were presented, the duration of the presentation of the ad on the website, and any actions taken with regard to the ad (e.g., the ad was clicked on, watched, closed after a period of time, etc.).

A pattern engine 124 may receive the ad history 118 corresponding to an identifier 112 associated with a particular customer 106 to identify one or more target times or call slots 116 as to when customer 106 may be available for contact, e.g., a phone call or other electronic communication from representative 104, including a text message or video call.

Pattern engine 124 may use information from ad history 118 and generate or identify call slots 116 indicating or corresponding to periods or patterns of computing activity (e.g., as determined through ad presentation) when customer 106 may be predicted to be available to communicate with representative 104. Example information from ad history 118 that may be used includes, but is not limited to, which websites 112 were visited, the duration or activity on those websites 122, the duration for which various ads were presented to the user device 110 on those websites 122, the content or subject matter of ads or website 122, and what actions were taken with regard to the ads.

In many embodiments, pattern engine 124 may generate call slots 116 based on the idea that more website ad activity (e.g., more ads or longer ad duration) as determined from ad history 118 corresponds to an availability of customer 106. For example, a first period of time may correspond to when customer 106 was engaged in a non-computing activity, such as playing a sport, or eating dinner, or watching television, there may be less computing or ad activity associated with user device 110 during those times. Or, for example, a second period of time may correspond to when customer 106 may be bored and surfing the web or doing research or reading something online, which is reflected in a different level of computing or ad activity associated with user device 110 during those times. Pattern engine 124 may predict and correlate greater computing and ad activity with a greater likelihood of availability to speak with a representative 104. The level of computing activity and the likelihood may be determined based on how many, which, and the duration of the ads that were presented to the customer 106 over various periods of time—which may be determined, extracted, or computed from ad history 118.

In many embodiments, pattern engine 124 may identify patterns of computing activity for customer 106 based on the customer's ad history 118. The patterns may be identified using an ad history 118 that has been recorded over an extended period of time, such as but not limited to weeks, months, or even years. In many embodiments, pattern engine 124 may using various clustering techniques and/or machine learning to identify patterns of website and/or ad activity.

For example, pattern engine 124 may determine that on Monday mornings, generally, from 9:45-10:19 am, the customer 106 visits a financial news website 122 where various stock trading ads are provided for average duration of 34 minutes. Pattern engine 124 may identify, tag, or label this activity as a preliminary or initial call slot 116.

Call action 126 may indicate a subject matter or other notes about what customer 106 wants to discuss and/or what information representative 104 needs from customer 106. In many embodiments, the greater the correspondence between the subject matter of the website 122 and/or ads that were presented (or clicked on) over a period of time to the subject matter of call action 126, the greater a weight that may be assigned to a prospective call slot 116.

In many embodiments, CCS 102 may use the subject matter to determine a readiness level, or readiness to speak, of customer 106. The readiness level may be a subject matter or activity specific determination. This may be based on the content or category of a website, the content or category of ads from ad history 118, compared to the subject matter of call action 126. In some aspects, the greater the overlap, the greater the readiness level.

For example, an organization may be a bank and call action 126 (as derived from message 108) may indicate a home loan question about purchasing a new home. Then, for example, if CCS 102 identifies a Monday morning call slot 116 when customer 106 repeatedly visited a financial website and was presented with financial ads, and a Thursday afternoon call slot 116 when customer 106 repeatedly was presented with sporting goods ads, CCS 102 may rank the Monday morning call slot 116 higher because it is more closely related to the subject matter of call action 126.

In many embodiments, CCS 102 may use the subject matter or context of call action 126 to determine a time estimate 128 of call action 126. Time estimate 128 may be an average or estimated amount of time that is anticipated for representative 104 to take to complete call action 126 with customer 106. For example, call action 126 may indicate that customer 106 is interested in one of products A or B, financing options, billing information, or other. Each of those different types of calls may have its own unique time estimate 128, which may have been tracked based historical data representing, e.g., previous calls by different representatives and with different customers. And based on historical data of these past calls regarding products A, B, financing, billing, and other, CCS 102 may retrieve or be provided a time estimate 128 regarding how long call action 126 is anticipated to take.

CCS 102 may use the time estimate 128 to determine how to value a call slot 116. For example, as noted above, pattern engine 124 may indicate a block of activity for 34 minutes on Monday mornings. If time estimate 128 is less than or equal to 34 minutes, then pattern engine 124 may generate or highly rank or value a call slot 116 for customer 106 on the Monday morning slot. If however, time estimate 128 is greater than the predicted availability of activity interval or preliminary call slot 116, then pattern engine 124 may not generate a call slot 116 for that time period or may rank or indicate it is less time than may be necessary as indicated by time estimate 128, and may value it less than other longer activity intervals or call slots 116.

In another embodiment, pattern engine 124 may limit when call slots 116 can be generated. For examiner, pattern engine 124 may determine that any blocks of activity greater than a minimum threshold time (e.g., five minutes, or ten minutes) are possible call slots 116. For example, any period of activity greater than ten minutes may be identified as a call slot 116 regardless of time estimate 128. However, CCS 102 may more greatly weigh those activity periods that are closest to or greater than time estimate 128 than those that are less. In many embodiments, if two call slots 116 of 12 and 18 minutes are identified, and time estimate 128 for a particular call action 126 is 48 minutes, then the 18 minute slot may be weighed more heavily than and preferable to the 12 minute slot. But if the time estimate 128 is 4 minutes, both slots may be weighed equally, or the 12 minute slots may be weighed more heavily as it is closer to the time estimate 128.

In many embodiments, pattern engine 124 may determine a time variance between the determined call slot 116 and the time estimate 128. The closer the correlation between the available time of call slot 116 and the time estimate 128, e.g., the less variance, the greater the likelihood of having a successful call with customer 106.

In many embodiments, pattern engine 124 may use various percentages to indicate success likelihood of calls. For example, low may be 33% or less, medium may 34%-69%, and high may be 70% or greater. For example, pattern engine 124 may divide time estimate 128 with the activity time of call slot 116 and generate a low, medium, or high success likelihood. For example, if call slot 116 was 18 minutes and the time estimate was 26 minutes, then 18 divided by 26 is 69.2% which would be a high likelihood of success.

Figure 2:
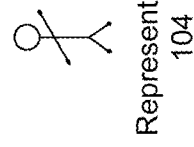
FIG. 2 is a block diagram illustrating an example interface for providing a contact callback system (CCS), according to some embodiments.

In many embodiments, the success likelihood or other weighing factors described herein may be color coded on a user interface 202 (as illustrated in FIG. 2) for representative 104, as red (low), yellow (medium), or green (high). In many embodiments, a representative 104 may still call a customer 106 during a red colored slot 116, which would still increase the likelihood of success rather than the representative 104 randomly guessing when to call.

In many embodiments, CCS 102 may set an alarm 130. Alarm 130 may be an indicator or notification to representative 104 as to when a particular call slot 116 for a particular customer 104 is about to arrive. Or, for example, alarm 130 may be an automatic dialing or connection system that automatically connects representative 104 to customer 106 during the designated call slot(s) 116.

In many embodiments, CCS 102 may receive feedback 132. Feedback 132 may include any information about the call, including, but not limited to call duration. Based on call duration CCS 102 may determine a success of the call, e.g., whether customer 106 was available to speak during the predicted call slot 116.

In many embodiments, duration may include a no answer or hang up indicator as well, indicating a failed call slot 116 or prediction. In another embodiment, a percentage between time estimate 128 and actual duration may also be used as a success indicator as to whether CCS 102 accurately predicted call slot 116. For example, if time estimate 128 is 42 minutes, and the call lasted 6 minutes, this may indicate a failure (e.g., that the customer 106 did not have enough time to speak). In many embodiments, representative 104 may provide additional feedback 132 that overrides or supplements the time indicator. For example, the 6 minute call may be a success if the customer 106 was able to speak and simply was not interested in the product or service any longer, customer 106 quickly received their answer, or customer 106 quickly made a decision. This feedback 132 may be received by CCS 102 and used to adjust time estimate 128.

In many embodiments, CCS 102 may use machine learning to help refine and improve its pattern engine 124 predictions of call slots 116. In many embodiments, the machine learning systems of pattern engine 132 may use feedback 132 to determine what variables (e.g., information from ad history 118) to weigh and/or to change the weight of those variables. For example, if CCS 102 receives feedback 132 from one or more representatives 104 that customers 106 are unavailable, then CCS 102 may determine if there is any overlap in the ad history 118 of those customers 106 used to make the availability determination.

For example, if an ad is served through an app X on user device 110 and that is used to determine the availability of a customer 106, the machine learning systems of pattern engine 124 may determine that ads served through app X cannot be used to determine customer availability or may be assigned a lower weight or confidence score. Or, for example, if the feedback 132 indicates a high availability of a set of customers 106, and the machine learning systems of pattern engine 124 indicate a correlation with ads served through app Y or from company Z, then those ads may be assigned a greater weight in determining availability relative to other ads.

It should be readily apparent to one having ordinary skill in the art that a variety of machine classifiers can be utilized in the machine learning systems of pattern engine 124. These machine classifiers include, but are not limited to, decision trees, k-nearest neighbors, support vector machines (SVM), neural networks (NN), recurrent neural networks (RNN), convolutional neural networks (CNN), probabilistic neural networks (PNN), and/or transformers. RNNs can further include (but are not limited to) fully recurrent networks, Hopfield networks, Boltzmann machines, self-organizing maps, learning vector quantization, simple recurrent networks, echo state networks, long short-term memory networks, bi-directional RNNs, hierarchical RNNs, stochastic neural networks, and/or genetic scale RNNs. In a number of embodiments, a combination of machine classifiers can be utilized, more specific machine classifiers when available, and general machine classifiers at other times can further increase the accuracy of predictions.

In many embodiments, CCS 102 may make real-time determinations as to whether customer 106 is online and possibly available right now. For example, customer 106 may submit message 108 via website 122 requesting a callback and additional information about a product or service. In requesting ad history 118 from ad server 120, CCS 102 may determine that an ad was provided for display on the IP address of user device 110 within the previous m minutes, which is below a time threshold.

For example, the customer 106 may have continued browsing website 122 or other websites where ads were provided. CCS 102 may interpret that a recent ad (within a particular time threshold m, such where m is 2, 5, 10, or 60 minutes) indicates that customer 106 is available now to speak. This indication may be provided to representative 104 as a high priority alarm. Representative 104 may then call customer 106 without pattern engine 124 performing additional analysis. If representative 104 is unable to connect with customer 106, then pattern engine 124 may perform the call slot 116 analysis described herein.

FIG. 2 is a block diagram 200 illustrating an example interface 202 for providing a contact callback system (CCS) 102, according to some embodiments.

In many embodiments, CCS 102 may provide a user interface 202 to representative 104. As indicated, user interface 202 may display a calendar with various call slots 216A-E. Call slots 216A-E may indicate when a particular customer 106 is predicted or anticipated to be free or available to speak to representative 104. Various call slots 216A-E may be color coded based on the various weighing factors, including but not limited to, the variance between the length of call slot 216A-E and time estimate 118.

In many embodiments, each call slot 216A-E may indicate a name, contact information, account information, subject matter, and/or any other information that may be used for representative 104 to speak to customer 106. In many embodiments, upon completion of a call action 126 (after speaking to customer 106), user interface 202 may allow representative to include notes or feedback 132 about the call, which may be saved in the client DB 114.

Call slots 216A-E may be the slots for one particular customer 106 and/or may be aggregated slots 216A-E for a number of different customers 106 to whom representative 104 is to speak. In many embodiments, customer 106 may be another employee of the same organization as representative 104.

Figure 3:
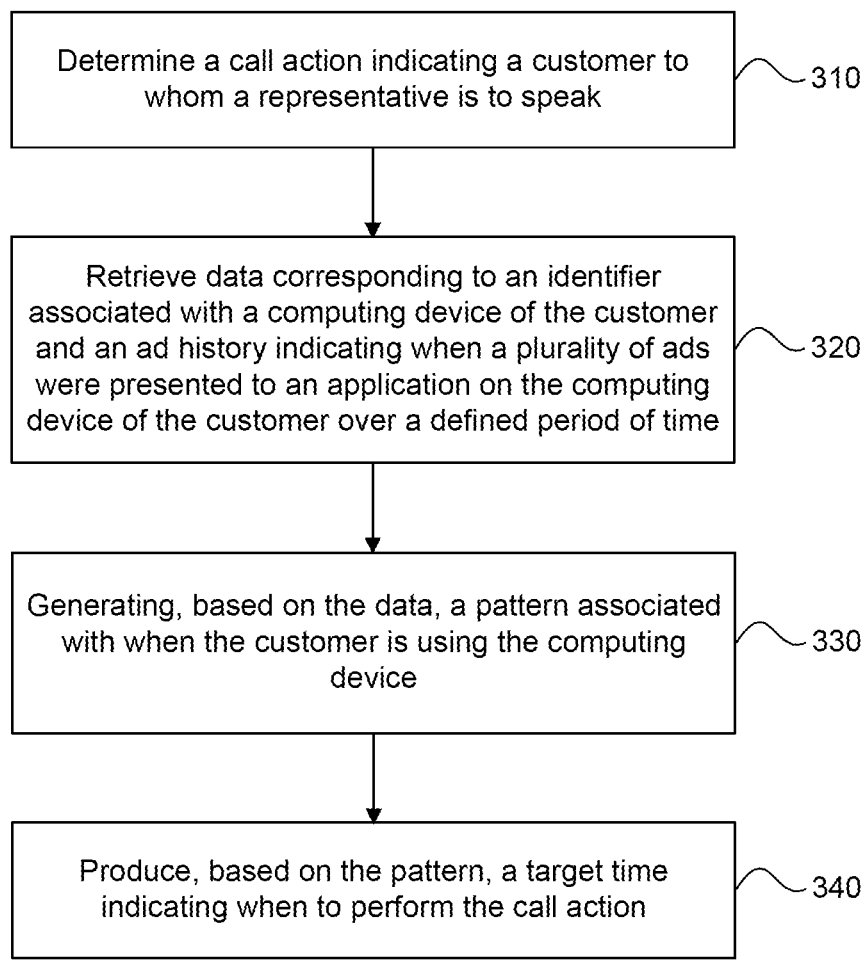
FIG. 3 is a flowchart illustrating example operations of a contact callback system (CCS), according to some embodiments.

FIG. 3 is a flowchart 300 illustrating example operations for providing a contact callback system (CCS), according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art. Without limiting method 300, method 300 is described with reference to elements FIGS. 1 and 2.

At 310, a call action indicating a customer to whom a representative is to speak to determined. For example, customer 106 may contact a company about a product through the company's website 122. Customer 106 may fill out a form requesting additional product information. The form may be received by CCS 102 as message 108. In many embodiments, CCS 102 may be able to determine information about the identity of customer 106 and/or user device 110 from message 108. In many embodiments, message 108 may also include a subject matter indication as well.

At 320, data corresponding to an identifier associated with a computing device of the customer and an ad history indicating when a plurality of ads were presented to an application on the computing device of the customer over a defined period of time are retrieved. For example, CCS 102 may identify an IP address from metadata of message 108 and match the IP address to a client about which there has already been a created profile from client DB 114. CCS 102 may also request or retrieve ad history 118 associated with an IP address, account number, and/or user ID of customer 106. Ad history 118 may include a tracking or record of which websites 122 and/or which ads were presented to the IP address or user ID over various periods of time.

At 330, a pattern associated with when the customer is using the computing device is generated based on the data. For example, the pattern is based on a comparison of a first period of time during which a first subset of the plurality of ads were presented to the computing device and a second period of time during which a second subset of the plurality of ads were presented to the computing device. For example, ad history 118 may include a record of when ads were delivered to an IP address of customer 106 on a day-by-day or week-by-week basis. In many embodiments, pattern engine 124 may then compare the daily data and/or weekly data to identify overlapping periods of computing or ad activity.

At 340, a target time indicating when to perform the call action is produced based on the pattern. For example, pattern engine 124 may identify or define one or more call slots 116 or 216A-E indicating when may be a good time for representative 104 to call customer 106.

In many embodiments, CCS 102 may alert (using an alarm 130) representative 104 before or when a particular call slot 116 or 216A-E corresponds to the current time. Or for example, CCS 102 may automatically dial customer 106 at the appropriate time corresponding to alarm 130. In many embodiments, CCS 102 may automatically dial the customer 106 and when the customer confirms through an automated system that they are ready to speak, may connect customer 106 with representative 104.

Figure 4:
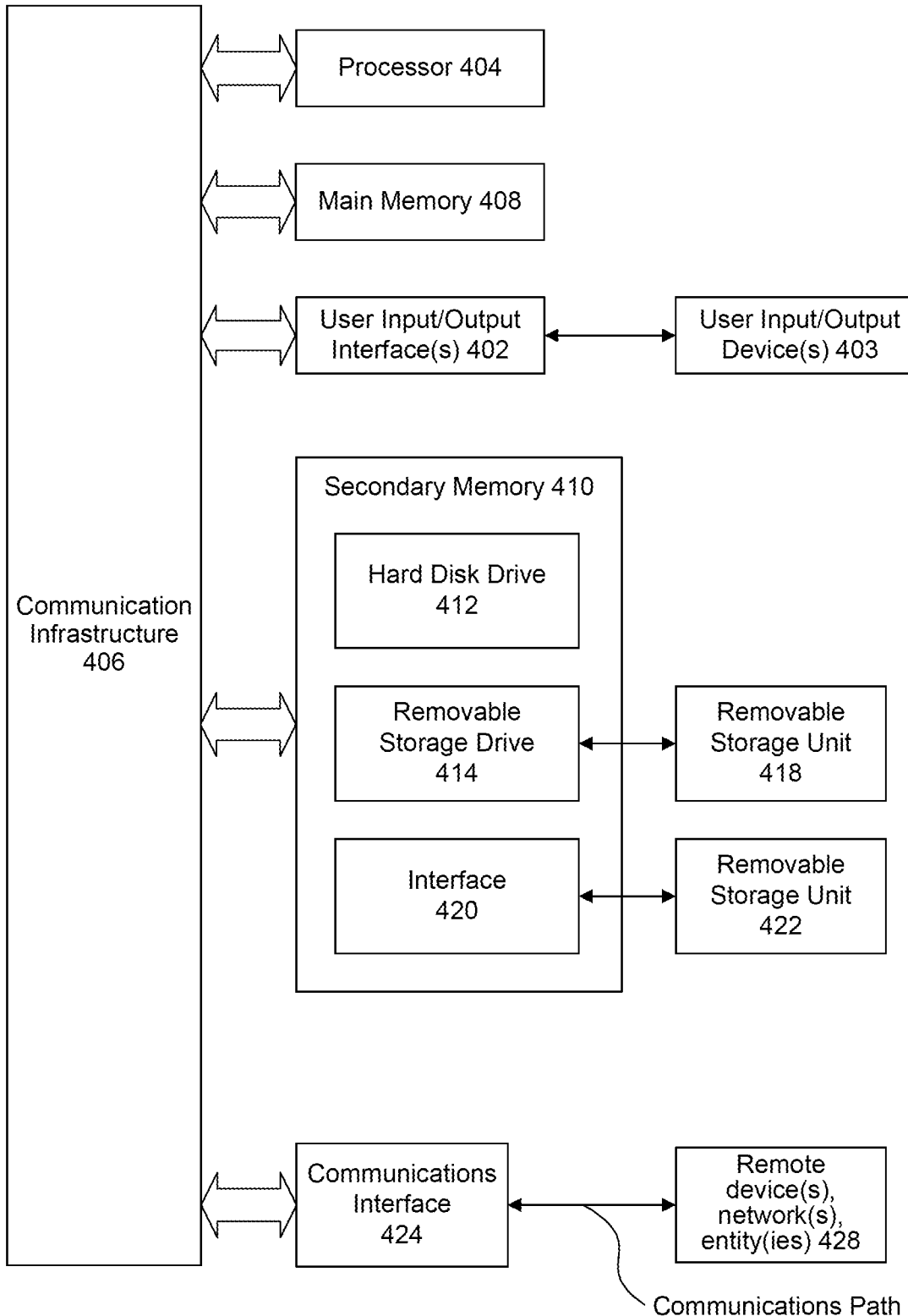
FIG. 4 is example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include customer input/output device(s) 403, such as monitors, keyboards, pointing devices, etc., which may communicate with communication infrastructure 406 through customer input/output interface(s) 402.

One or more of processors 404 may be a graphics processing unit (GPU). In many embodiments, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with many embodiments, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments but should be defined only in accordance with the following claims and their equivalents.

What is claimed is:
1. A computer-implemented method, comprising:
  determining a call action indicating a customer to whom a representative is to speak;
  determining an identifier associated with the customer, wherein the identifier corresponds to a computing device;

retrieving an ad history indicating when a plurality of ads were presented to the computing device over a defined period of time;

identifying a pattern associated with when a subset of the plurality of ads were presented to the computing device, wherein the pattern indicates an overlapping time of day on at least two separate days when one or more of the subset of the plurality of ads were presented to the computing device; and providing the overlapping time of day to the representative during which to perform the call action.

2. The computer-implemented method of claim 1, wherein the providing comprises:

setting an alarm for the overlapping time of day;
determining that a current time corresponds to the overlapping time of day; and
calling the customer on behalf of the representative.

3. The computer-implemented method of claim 1, wherein the call action indicates an estimated amount of time for the call action.

4. The computer-implemented method of claim 3, further comprising:

determining a duration associated with the presented subset of the plurality of ads; and
determining that a duration associated with the overlapping time of day meets or exceeds the estimated amount of time.

5. The computer-implemented method of claim 1, wherein the identifying a pattern comprises:

clustering the presented plurality of ads to the computing device on at least one of a day-by-day or week-by-week basis.

6. The computer-implemented method of claim 1, wherein the determining the call action comprises:

receiving a request from the customer to receive a callback regarding a product or service associated with the representative.

7. The computer-implemented method of claim 1, wherein the identifier comprises an internet protocol (IP) address associated with the computing device.

8. The computer-implemented method of claim 1, further comprising:

determining that the call action has been completed; and
receiving feedback indicating a duration of the call action between the representative and the customer.

9. A system for efficient utilization of cloud computing services, comprising:

a memory; and
at least one processor coupled to the memory and configured to perform operations comprising:
determining a call action indicating a customer to whom a representative is to speak;
determining an identifier associated with the customer, wherein the identifier corresponds to a computing device;
retrieving an ad history indicating when a plurality of ads were presented to the computing device over a defined period of time;
identifying a pattern associated with when a subset of the plurality of ads were presented to the computing device, wherein the pattern indicates an overlapping time of day on at least two separate days when one or more of the subset of the plurality of ads were presented to the computing device; and
providing the overlapping time of day to the representative during which to perform the call action.

10. The system of claim 9, wherein the providing comprises:

setting an alarm for the overlapping time of day;
determining that a current time corresponds to the overlapping time of day; and
calling the customer on behalf of the representative.

11. The system of claim 9, wherein the call action indicates an estimated amount of time for the call action.

12. The system of claim 11, wherein the operations further comprise:

determining a duration associated with the presented subset of the plurality of ads; and
determining that a duration associated with the overlapping time of day meets or exceeds the estimated amount of time.

13. The system of claim 9, wherein the identifying a pattern comprises:

clustering the presented plurality of ads to the computing device on at least one of a day-by-day or week-by-week basis.

14. The system of claim 9, wherein the determining the call action comprises:

receiving a request from the customer to receive a callback regarding a product or service associated with the representative.

15. The system of claim 9, wherein the identifier comprises an internet protocol (IP) address associated with the computing device.

16. The system of claim 9, wherein the operations further comprise:

determining that the call action has been completed; and
receiving feedback indicating a duration of the call action between the representative and the customer.

17. A non-transitory computer-readable device having instructions stored thereon that, when executed by at least one computing device, cause the at least one computing device to perform operations for efficient utilization of cloud computing services, the operations comprising:

determining a call action indicating a customer to whom a representative is to speak;
determining an identifier associated with the customer, wherein the identifier corresponds to a customer computing device;
retrieving an ad history indicating when a plurality of ads were presented to the customer computing device over a defined period of time;
identifying a pattern associated with when a subset of the plurality of ads were presented to the customer computing device, wherein the pattern indicates an overlapping time of day on at least two separate days when one or more of the subset of the plurality of ads were presented to the customer computing device; and
providing the overlapping time of day to the representative during which to perform the call action.

18. The non-transitory computer-readable device of claim 17, wherein the providing comprises:

setting an alarm for the overlapping time of day;
determining that a current time corresponds to the overlapping time of day; and
calling the customer on behalf of the representative.

19. The non-transitory computer-readable device of claim 17, wherein the call action indicates an estimated amount of time for the call action.

20. The non-transitory computer-readable device of claim 19, wherein the operations further comprise:

determining a duration associated with the presented subset of the plurality of ads; and determining that a duration associated with the overlapping time of day meets or exceeds the estimated amount of time.

\* \* \* \* \*